United States Patent [19]
Houel

[11] Patent Number: 5,901,638
[45] Date of Patent: May 11, 1999

[54] TOASTER WITH MEANS FOR SELECTION OF TWO BREAD DISCHARGE POSITIONS

[75] Inventor: Jean-Pierre Houel, Saint Ame, France

[73] Assignee: SEB S.A., Ecully, France

[21] Appl. No.: 09/167,673

[22] Filed: Oct. 7, 1998

[30] Foreign Application Priority Data

Oct. 7, 1997 [FR] France .................................. 97 12731

[51] Int. Cl.⁶ .............................. A47J 37/08; H05B 1/02
[52] U.S. Cl. ...................... 99/327; 99/329 P; 99/329 RT; 99/389; 99/391; 219/492; 219/521
[58] Field of Search .............................. 99/389–391, 385, 99/393, 326–333, 396, 400–402; 219/492, 494, 506, 411, 413, 481, 489, 521, 525, 528; 392/365, 373

[56] References Cited

U.S. PATENT DOCUMENTS

| | | | |
|---|---|---|---|
| 2,330,644 | 9/1943 | Uhlrig | 99/327 |
| 5,018,437 | 5/1991 | San Juan | 99/327 |
| 5,072,662 | 12/1991 | Yip | 99/327 |
| 5,095,814 | 3/1992 | Ott et al. | 99/391 |
| 5,385,082 | 1/1995 | Huggler et al. | 219/492 X |
| 5,647,270 | 7/1997 | Rousseau et al. | 99/327 |
| 5,664,481 | 9/1997 | Huggler | 219/521 X |
| 5,746,115 | 5/1998 | Yip | 99/391 X |
| 5,771,780 | 6/1998 | Basora et al. | 99/327 |
| 5,802,958 | 9/1998 | Hermansson | 99/379 X |

FOREIGN PATENT DOCUMENTS

| | | |
|---|---|---|
| 450 457 | 10/1991 | European Pat. Off. . |
| 79 28185 | 11/1979 | France . |
| 2 729 285 | 7/1996 | France . |
| 90 14 527 | 1/1991 | Germany . |

*Primary Examiner*—Timothy F. Simone
*Attorney, Agent, or Firm*—Pillsbury Madison & Sutro

[57] ABSTRACT

A bread toaster comprising: a frame; a bread-supporting carriage mounted in the frame for vertical movement between a toasting portion and a first bread discharge position, the carriage having an extension; first cushioning means for cushioning arrival of the carriage at the first bread discharge position; return means mounted between the frame and the extension of the carriage; and a control means having an abutment and being movable in the frame for limiting ascent of the carriage to a second position by interaction of the abutment with a part of the carriage, wherein: the second position is a second bread discharge position for discharging bread having a first size and the first bread discharge position is a position for discharging bread having a size smaller than the first size; and one of the abutment and the part of the carriage which interacts with the abutment is provided with second cushioning means for cushioning arrival of the carriage at the second position.

18 Claims, 5 Drawing Sheets

TOASTER WITH MEANS FOR SELECTION OF TWO BREAD DISCHARGE POSITIONS

BACKGROUND OF THE INVENTION

The present invention relates to the technical field of household electrical appliances of the toaster type, and more particularly to a toaster having a carriage that can be brought to a position called complementary raised position, which position is intended for retrieval of small slices of bread.

French Patent Document FR 2 729 285 discloses a toaster having a return spring, in which the ascent into the complementary position is effectuated, after a first ascent, by compression of a second spring. This system requires an effort on the part of the user which is liable to destabilize the toaster and requires that one of the user's hands be used to maintain the spring compressed in order to assure the additional raising function, causing the bread discharge operation to be tricky. In addition, other published documents describe systems permitting interruption of the ascent of the bread supporting carriage at an intermediate position between a lowered position in which the bread is toasted and a rest position of the carriage, corresponding to discharge of the bread. This interruption permits, after a cooking cycle, the bread to be left in the toasting enclosure and to remain warm. Thus, U.S. Pat. No. 2,330,644 describes a toaster which can keep bread slices warm at the interior of the toasting chamber of the toaster, by the intermediary of a blade which pivots in a plane perpendicular to the plain defined by the displacement of the carriage. According to the positioning of this blade, its extremity permits ascent of the carriage to be prevented. Control of the pivoting of the blade is assured by an external means situated at the side of the appliance, at the level of the carriage intermediate position for keeping the bread warm. However, this procedure does not permit discharge of the bread in this intermediate position.

BRIEF SUMMARY OF THE INVENTION

One of the objects of the present invention is to overcome the drawbacks described above by providing a toaster having two stable bread discharge positions. This arrangement makes it unnecessary for the user to have to hold a control means in order to assure the additional lifting function, thus permitting the user to have both hands free to withdraw the bread.

Another object of the invention is to enable the carriage to be moved to a complementary raised position in a simple manner which is not cumbersome and is easy to perform.

The above and other objects are achieved, according to the present invention, by the provision of a bread toaster comprising:

a frame;

a bread-supporting carriage mounted in the frame for vertical movement between a toasting portion and a first bread discharge position, the carriage having an extension;

first cushioning means for cushioning arrival of the carriage at the first bread discharge position;

return means mounted between the frame and the extension of the carriage; and a control means having an abutment and being movable in the frame for limiting ascent of the carriage to a second position by interaction of the abutment with a part of the carriage, wherein:

the second position is a second bread discharge position for discharging bread having a first size and the first bread discharge position is a position for discharging bread having a size smaller than the first size; and one of the abutment and the part of the carriage which interacts with the abutment is provided with second cushioning means for cushioning arrival of the carriage at the second position.

Thus, the present invention permits the bread-supporting carriage to be positioned either in a conventional bread discharge position or in an elevated discharge position, called "more elevated" or "raised plus", which is a stable position, with the aid of a single control means. The natural rest position of the carriage is the upper discharge position, while the abutment of the control means is capable of stopping this ascent at a second rest position, lower than the first position for convenient discharge of a bread slice having normal dimensions.

Furthermore, for each of the possible discharge positions, the bread-supporting carriage is cushioned, or damped, upon arrival at that position, which prevents slices of bread from being ejected out of the toaster and reduces the noise which occurs when the carriage is halted.

According to the invention, one of the extremities of the control means extends out of the upper part of the housing and is associated with a system of reference marks indicating various raised positions of the carriage. The exterior positioning of the control means at the top of the toaster permits an optimal utilization thereof since the user can see, in a single field of view, the toasting state of the bread in the toasting chamber and the position of the means for controlling the complementary ascent of the carriage.

According to the invention, the abutment is the extremity of a vertical shank, or rod, fixed to a horizontal cross piece which can be displaced by the control means, the cross piece or the shank being mounted for horizontal translational movement in a housing. This arrangement permits use to be made of only one abutment, while permitting its displacement to be effectuated economically.

According to a first embodiment of the abutment, this is constituted by:

a cylinder sliding along the shank, a cushioning spring arranged at the interior of the cylinder and coaxial with the shank or its extremity, the spring being mechanically coupled by one of its ends with the shank or a piece fixed to the shank, and by its other extremity to the abutment, and a means for halting the sliding of the abutment, composed of complementary interacting parts placed on the shank and on the abutment. Such an arrangement permits the arrangement of an abutment which is moveable at the extremity of the shank against a return means, thus constituting, in a reduced space, a means for halting and cushioning the ascent of the bread-supporting carriage.

According to this latter configuration, the halting means is constituted by a tenon connected to the cylinder of the abutment engaged in a groove of the shank, or vice versa, by a tenon connected to the shank and engaged in a groove in the cylinder of the abutment. Such a connection permits a guided sliding of the cylinder while limiting the amplitude of the movement.

According to a second embodiment of the abutment, the means for stopping is constituted by a flange fixed to the shank, one of the extremities of the cylinder of the abutment being capable of coming to bear on this flange when the abutment is not interacting with the extension of the bread-supporting carriage. The spring is linked with the shank by bearing on the lower part of this flange. This arrangement permits, by means of the single flange, the cylinder to be maintained around the shank while blocking sliding of the cushioning spring around the shank.

According to a modified embodiment of the present invention, a recess, or hollowed out area, is provided in the extension of the carriage, this recess being capable of cooperating with the abutment in order to permit the carriage to ascend to its first position for discharging bread. This arrangement permits a reduction of the additional space generated by such a function by integrating that space into the carriage.

According to a first form of construction of this embodiment, the first and second cushioning means for the carriage are situated on the carriage itself, the recess carrying at least the second cushioning means. Such a form of construction permits the design of a simple shank and abutment system, the abutment being the extremity of the shank.

According to a second form of construction, the depth of the recess is such that the second cushioning means also constitute the first cushioning means. This form of construction permits economies to be achieved with respect to the pieces constituting the first cushioning means.

According to one of the preceding configurations of the invention, the shank is mounted to be movable against a return means in such a manner that when the shank is at one rest position, the abutment assures ascent of the carriage into one of the two bread discharge positions. Thus, automatically, the carriage is halted in one of these bread discharge positions, which permits a simplification in the manner of utilizing the appliance.

According to a variation of the preceding configuration, it is not the shank which is mounted to be movable but the cross piece which is mounted to be movable against a return means in such a manner that at rest, the abutment assures ascent of the carriage into one of the two bread discharge positions, the return means being arranged coaxially to the cross piece, and the cross piece constituting a guide for the return means.

Advantageously, the control means or the cross piece or the shank is provided with means that are complementary to the housing arranged to maintain the control means or the cross piece or the shank in a position which opposes the force exerted by the return means, this position being intended to assure ascent of the carriage to one of two bread discharge positions. This arrangement permits the user to select the level to which the carriage will ascend when the carriage is in its lowered position at which toasting occurs, without having to await the end of the toasting cycle.

According to a first form of construction of the control means, in a simplified and economic version of the invention, the control means forms a unit with the cross piece.

According to a second form of construction of the control means, it is separated from the cross piece and is mounted to be movable substantially vertically along the axis of movement x-x' of the bread-supporting carriage, against a return means This arrangement utilizes a downward movement of the control means, which does not destabilize the toaster when the control means is activated. Moreover, the transformation of the vertical movement of the control means into a horizontal movement of the cross piece results in a gain of space and facilitates the installation of the device in the toaster.

According to this form of construction, the control means has, on a lateral extension, a beveled edge in contact with a finger of the cross piece linked to the shank. The beveled edge permits, during displacement of the control means, a displacement of the shank in a direction perpendicular to the direction of ascent of the bread-supporting carriage. This is a transformation of the vertical movement of the control means into a horizontal movement of the shank is effectuated smoothly due to the beveled edge and permits a choice to be easily made, by proper selection of the slope of the beveled edge, of the amplitude of movement transmitted to the shank.

According to a third form of construction of the control means, this latter is coupled to a cylindrical piece having two peripheral and diametrically opposed lugs, the cylindrical piece being mounted to move vertically in opposition to a return force at the interior of a cylindrical element having internal projections in the form of beveled edges arranged in such a manner as to form means for halting and/or retaining the lugs at two levels permitting positioning of the control means at two levels. The user can then select, during toasting, the desired level to which the carriage is to ascend.

According to a fourth form of construction of the control means, this latter is a bascule, or rocker, having a pivot axis that is situated in a plane perpendicular to the plane defined by the ascending movement of the carriage and comprising a shank oriented substantially perpendicularly to this axis and capable of cooperating with a finger connected to a cross piece. This configuration is simple to put to use and the selected raised position is easily identifiable by the user. Moreover, operation of the bascule does not destabilize the toaster.

According to this latter form of construction, the control means is situated at the interior of a support having a boss forming a hard point capable of maintaining the control means coupled, by the finger, to the cross piece in a position opposing the force exerted by the return means, which position is intended to assure the ascent of the carriage to one of the two bread discharge positions. This configuration combines the advantages described in connection with the previous form of construction, while providing a simpler and less expensive form of construction.

Preferred embodiments of the invention will now be described with reference to the drawings, which illustrates structures that are given solely by way of non-limiting example.

DETAILED DESCRIPTION OF THE INVENTION

Figure 1:
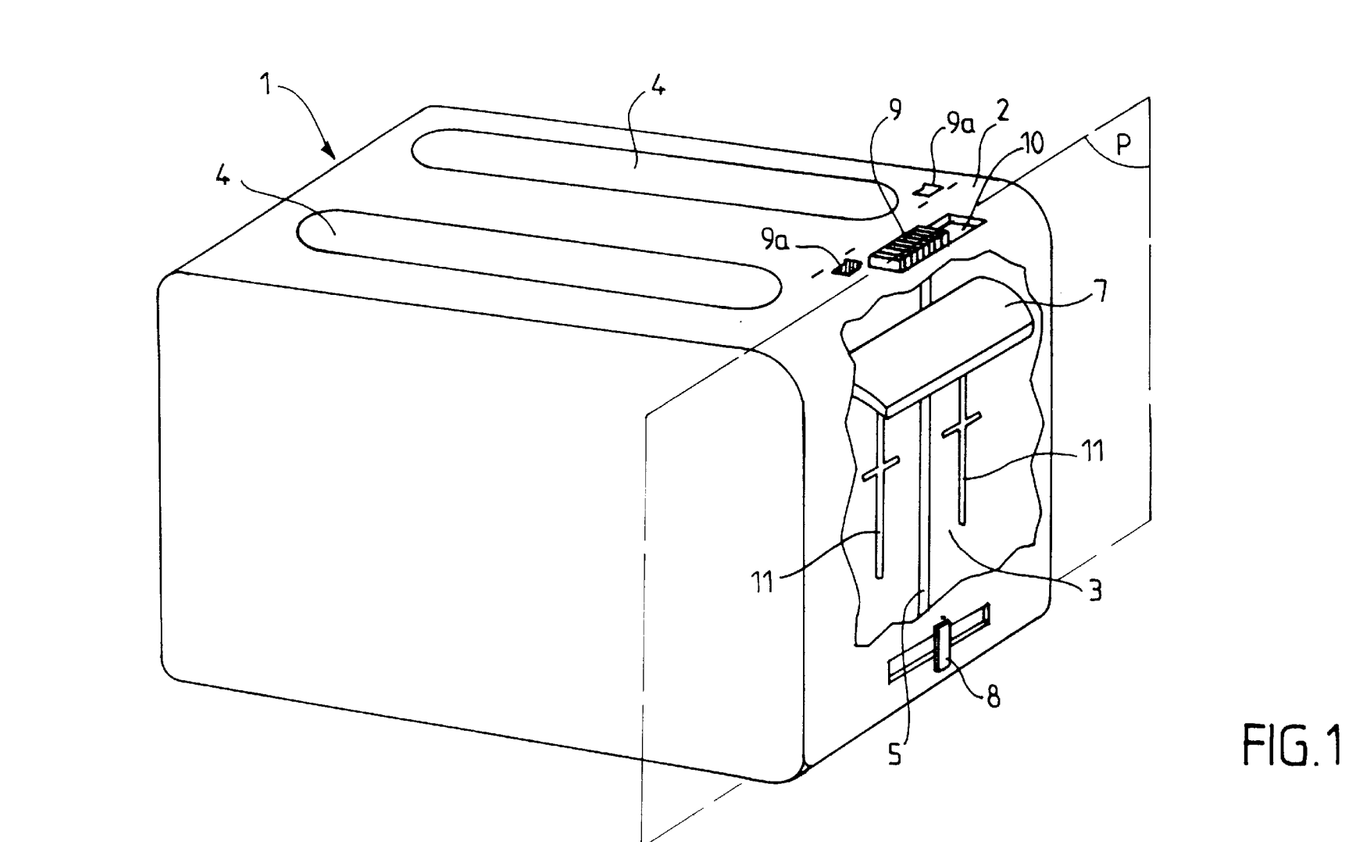
FIG. 1 is a perspective view of a toaster according to the present invention.

FIG. 1 provides a perspective view of a toaster 1 according to the invention. This toaster includes a housing 2 which is shown in a cut away view to permit viewing of components according to the present invention which would not be visible in an actual toaster. Toaster 1 includes, in particular, within housing 2, a frame 3, at least one toasting chamber and a bread-supporting carriage, not illustrated in its entirety, disposed within the chamber. Vertical movement of the carriage is guided by a shank, or rod, 5. The carriage has an extension 6 (FIGS. 2 and 3) which extends out of the toasting chamber. Extension 6 is associated with a lever, or handle, 7 which extends out of housing 2 and permits the carriage to be moved to a lowered position for toasting. Toaster 1 is equipped, moreover, with means 8 for controlling the toasting time.

According to the invention, the toaster is equipped with a control element 9 capable of interrupting the ascent of the carriage, the control means projecting out of housing 2. Control element 9 can be a piece having any form, but is preferably grooved in order to facilitate manipulation. According to one embodiment of the invention, the control means is mounted on a cross-piece 10 which slides in a receptacle arranged in housing 2 in a direction perpendicular to the direction of ascending movement of the carriage. Control element 9 is associated with reference indicia 9a which indicate to the user the two positions of control element 9 associated with the two raised positions of the carriage. In the cut away portion of housing 2, there can be seen slots 11 which permit extension 6 to slide freely with the carriage outside of the toasting chamber.

Figure 2:
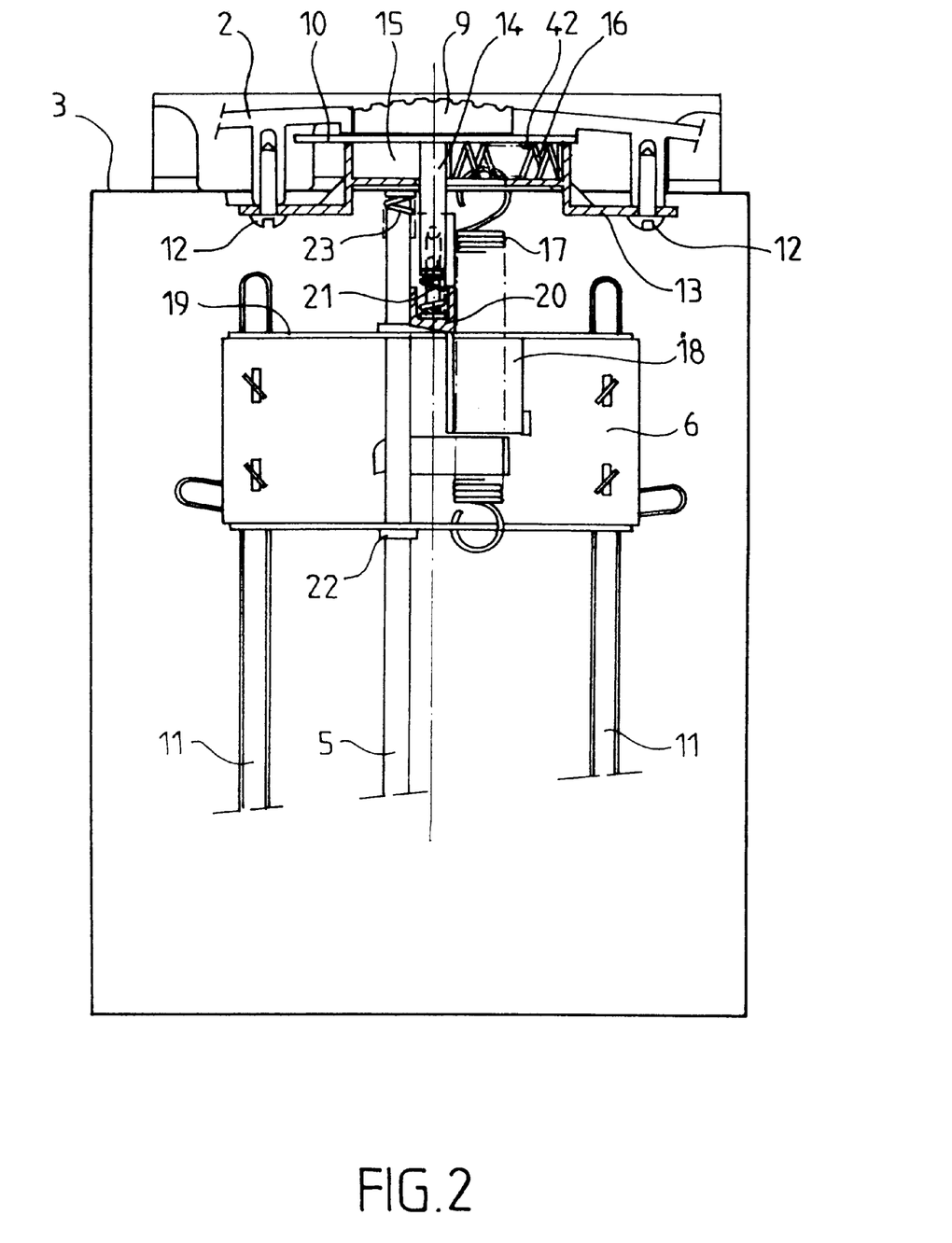
FIGS. 2 and 3 are side elevational views, partly in cross section, showing one embodiment of a toaster according to the invention in two different positions.
Figure 3:
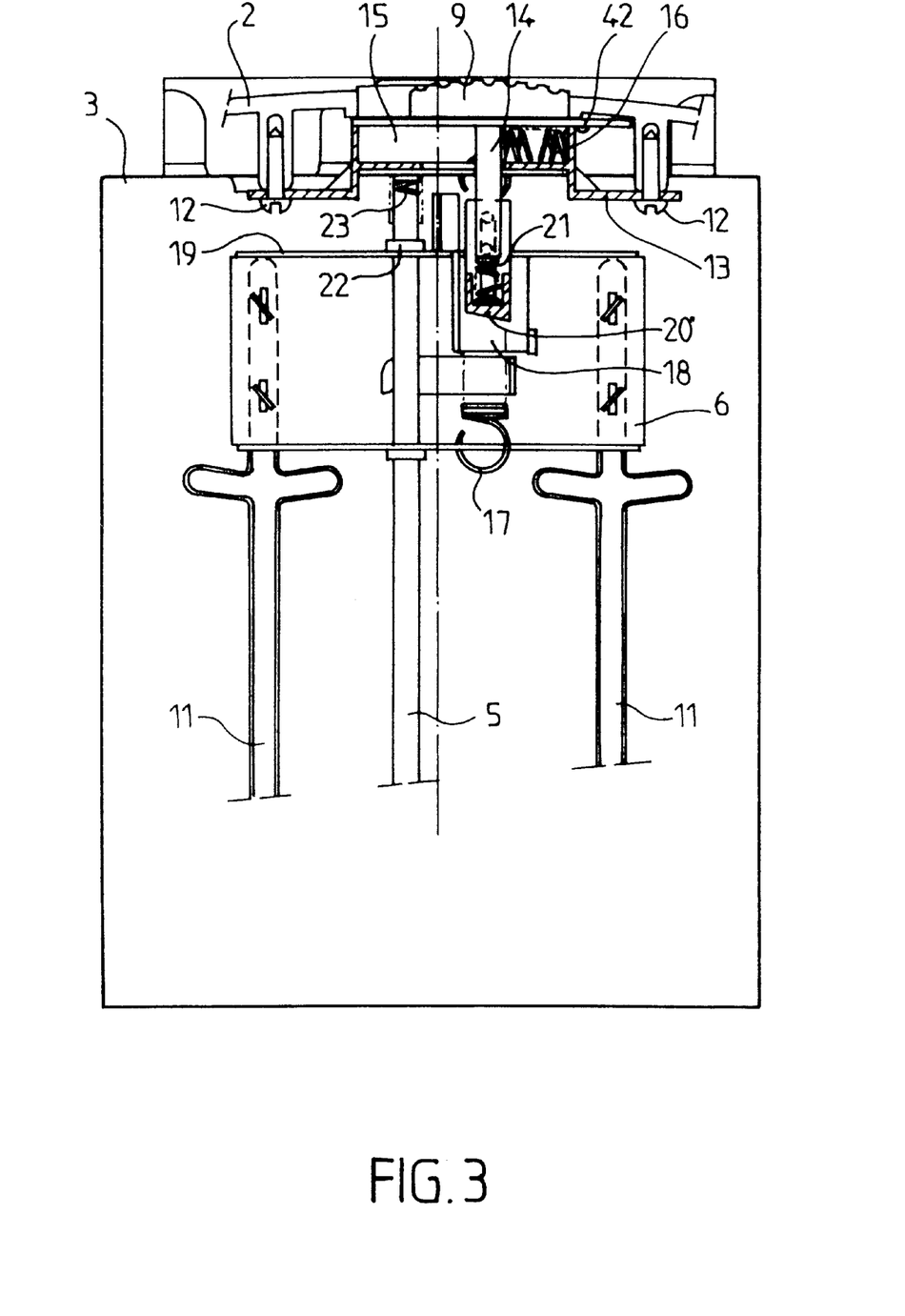

FIGS. 2 and 3 are end views essentially in the plane of FIG. 1. These figures show the upper part of a toaster and illustrate only those elements which are essential to and understanding of the invention. In FIG. 2, extension 6 and its associated carriage are in the lower one of the two bread discharge positions, while in FIG. 3, those parts are in the upper one of the two positions.

A support 13 of the control means is mechanically fixed on a frame 3 of the toaster by the intermediary of two screws 12. A cross piece 10 and a rod 14 are fixed to control element 9. Rod 14 may have a polygonal or cylindrical cross section and extends vertically downwardly from cross piece 10. According to one inexpensive form of construction, cross piece 10 may be shortened to form an L-shaped piece with rod 14.

Advantageously, rod 14 carries, at its lower end, an abutment 20. According to an inexpensive form of construction, abutment 20 can be constituted simply by the lower extremity of rod 14. Alternatively, as illustrated, abutment 20 may be a separate piece which is attached to rod 14. According to one embodiment of the invention, abutment 20 is coupled to rod 14 via a cushioning spring 21 that permits abutment 20 to have a certain freedom of vertical movement relative to rod 14.

In the illustrated embodiment, abutment 20 is cylindrical and spring 21 is mounted at the interior of abutment 20 and around rod 14 at the lower extremity thereof. Spring 21 extends coaxially with rod 14 and abutment 20. The lower extremity of rod 14 is given a reduced outer diameter in order to provide a means for guiding spring 21 while preventing spring 21 from sliding upwardly along rod 14. Abutment 20 is mounted for sliding movement by means of a tenon which slides in a groove of rod 14. This arrangement of elements can, of course, be reversed such that a tenon formed on rod 14 is slidable in a groove provided in cylindrical abutment 20. Abutment 20 and spring 21 permit cushioning of ascending movement of the carriage to its first, or lower bread discharge position, as a result of the interaction of abutment 20 with carriage extension 6.

An enclosure 15 is formed in support 13. Enclosure 15 provides a free space that permits free sliding of rod 14 and of cross piece 10. A compression spring 16 is suitably disposed in enclosure 15 to assure return movement of control element 9 through the intermediary of rod 14.

FIGS. 2 and 3 also illustrate extension 6 of the carriage, guide rod 5 for the carriage and slots 11 which permit the carriage that is connected to extension 6 to slide in the toasting chamber. A spring 23 is slidably mounted on guide rod 5. One of the ends of spring 23 is fixed to the upper part of frame 3. Extension 6 has two annular protrusions 22 situated, respectively, at the top and bottom of extension 6 and each surrounding guide rod 5. The two projections 22 can be created by forming or shaping the material constituting extension 6 and assure proper guidance of the carriage on rod 5. A return spring 17 is a tension spring with urges the carriage upwardly, at the end of a toasting cycle, from its toasting position to its higher discharge position. The higher discharge position is, in effect, the rest position of the carriage. Spring 17 is thus connected between frame 3 and extension 6.

According to a particular embodiment of the invention, a recess 18 is formed in extension 6. Recess 18 is located to cooperate with abutment 20 equipped with its cushioning device. For this purpose, recess 18 has a generally rectangular form with a horizontal dimension slightly greater than the lateral extent of abutment 20 so that when control element 9 is in a defined position, abutment 20 can freely enter into recess 18. According to a first form of construction of this embodiment, the depth of recess 18 is such that when abutment 20 engages in recess 18, it does not interfere with ascent of the carriage to its rest position, which is its upper discharge position. This position is shown in FIG. 3.

Control element 9 thus permits positioning of rod 14 in either one of two positions. The first position permits abutment 20 to engage freely in recess 18 of extension 6, allowing extension 6 and its carriage to ascend to the higher discharge position. The second position permits the carriage to be halted in a lower, or intermediate, bread discharge position, by contact between surface 19 of extension 6 and abutment 20 of rod 14. This position is shown in FIG. 2.

Thus, FIG. 2 illustrates the operating configuration where control element 9 is in a position to prevent abutment 20 from entering recess 18. The carriage is then halted before reaching its normal rest position, which is the upper bread discharge position, by contact between abutment 20, connected to rod 14, and surface 19 of extension 6. Impact of extension 6 against abutment 20 is cushioned by spring 21.

It will be readily apparent that many other arrangements of abutment 20 and extension 6 can be utilized to achieve the desired interaction between these two elements only when the control means is disposed in one of its two positions, without departing from the framework of the present invention. Ascending movement of the carriage can be halted, for example, by contact between abutment 20 and a simple blade or projection 22, the ascent into the higher discharge position being effectuated by eliminating interaction between abutment 20 and extension 6, as if this stopping system did not exist.

In the operating state illustrated in FIG. 3, control element 9 has been positioned by the user such that abutment 20 and its cushioning element can enter into recess 18. In this operating state, there is no interaction between abutment 20 and extension 6 and the carriage can ascend from its toasting position to its upper bread discharge position, where its upper movement is halted and cushioned by spring 23, which becomes compressed between support 13 and projection 22 on surface 19 of extension 6.

In the operating state shown in FIG. 3, when the user again lowers the carriage, abutment 20 is no longer restrained in the horizontal direction by recess 18, allowing spring 16, which has been compressed in enclosure 15 when abutment 20 was in recess 18, to expand, thereby causing rod 14 and control element 9 to slide horizontally toward the position depicted in FIGS. 1 and 2. Abutment 20 can be chamfered, or sloped, in order to make the sliding movement of abutment 20 during descent of the carriage more gradual.

The above-described configuration, which produces an automatic return of control element 9 to the position which allows the carriage to ascend to its standard bread discharge position can be reversed by changing the position of spring 16 relative to rod 14 so that control element 9 will be automatically returned to a position which allows the carriage to ascend to its upper bread discharge position.

According to another feature of the embodiment illustrated in the FIGS. 2 and 3, cross piece 10 is provided with a downwardly projecting boss 42 arranged to cooperate with housing 2 or frame 3 in order to maintain control element 9 in the position shown in FIG. 3, in which position spring 16 is slightly compressed. This feature permits the user to select the desired bread discharged position at the time a toasting operation is initiated by lowering the carriage into its toasting position.

Figure 4:
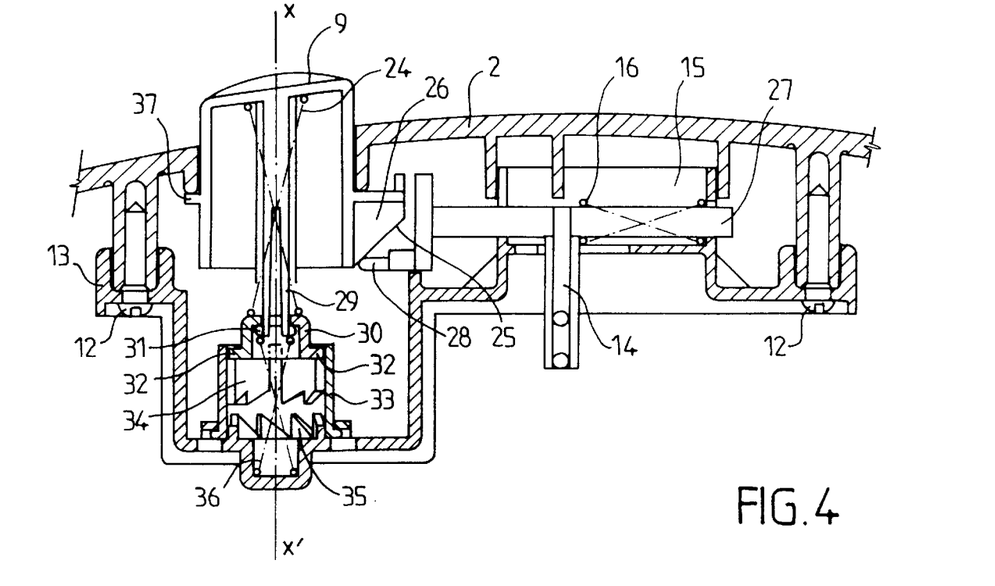
FIGS. 4 and 5 are elevational, cross-sectional, detailed views of one embodiment of a control means according to the invention in two stable positions.
Figure 5:
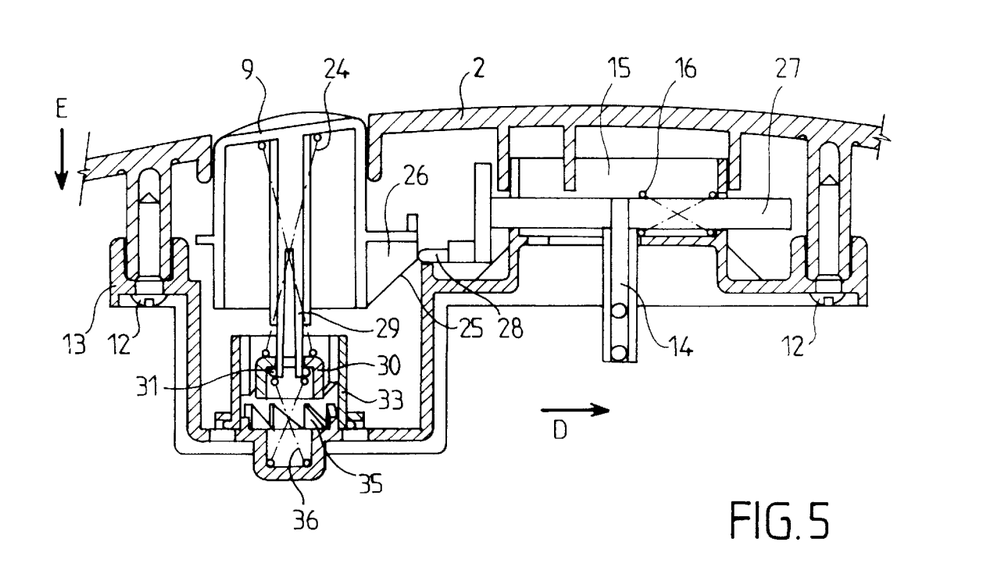

Referring to FIGS. 4 and 5, a cooperation of the type described above can also be achieved between a cross piece 27 and housing 2 or between rod 14 and housing 2 without departing from the framework of the invention.

FIGS. 4 and 5 show a second embodiment of the invention where a lateral displacement of rod 14 is effectuated by a vertical displacement of control element 9, which is structurally separate from cross piece 27. Thus, FIG. 4 shows a first structural variation of control element 9.

On the other hand, cross piece 27 forms a unit with rod 14 and extends perpendicular to rod 14 so that cross piece 27 and rod 14 have the form of a T. This arrangement in the form of a T has the advantage, with respect to an arrangement having the form of an L, to allow spring 16 to be easily installed around cross piece 27 between one of the extremities of cross piece 27 and rod 14.

Cross piece 27 includes, at one of its extremities, a finger 28. Cross piece 27 is positioned so that finger 28 is in contact with a beveled surface 25 formed on a lateral projection 26 of control element 9. Preferably, spring 16 is disposed at the side of rod 14 which is opposite to finger 28 and spring 16 is dimensioned to be slightly compressed when in its expanded state, as shown in FIG. 4. Spring 16 is placed in this state by rod 14 and the geometry of enclosure 15. This arrangement of spring 16 permits spring 16 to exert a slight pressure which maintains finger 28 against beveled surface 25. In addition, support 13 constitutes, by its form, a guide for rod 14 and cross piece 27 and, in particular, limits the movement of cross piece 27 in the direction of vertical movement of the carriage. Rod 14 carries, at its lower extremity, an abutment (not shown) which can have the same form as abutment 20 in FIGS. 2 and 3.

Control element 9 has a generally cylindrical form and can slide vertically along axis x, x', parallel to the direction of vertical movement of the carriage. Because of the manner in which control element 9 is moved in the embodiment of FIGS. 4 and 5, this movement does not produce any destabilization of the toaster. Control element 9 is essentially disposed at the interior of support 13, which is secured to housing 2 by two screws 12. Control element 9 is in the form of a hollow button containing, at its interior, a shaft surrounded by a compression spring 24. The shaft includes a central pin 29 which projects downwardly out of control element 9 along axis x-x'.

A cylindrical element 30 is mounted on pin 29 in a manner to be slidable vertically relative to pin 29. The lower end of pin 29 is provided with an annular abutment 31 which projects radially outwardly from pin 29 in order to retain element 30 on pin 29. Element 30 carries two diametrically opposed, radially outwardly extending peripheral lugs 32. Element 30 is vertically slidable within a cylinder 33 having an interior surface provided with two internal raised portions 34 and 35. As is best shown in FIG. 4, these portions extend inwardly from the wall of cylinder 33. Raised portion 34 is provided with a plurality of vertical grooves, or slots, which extend to the upper end of portion 34. The lower edge of portion 34 is provided with a series of teeth having a saw tooth form. The upper end of portion 35 is also provided with a series of teeth having a saw tooth form, and portion 35 thus has the general form of a toothed crown.

A spring 36 is disposed between support 13 and abutment 31. Spring 36 is a compression spring which produces a force urging cylindrical element 30 toward an upper position in cylinder 33.

Figure 6:
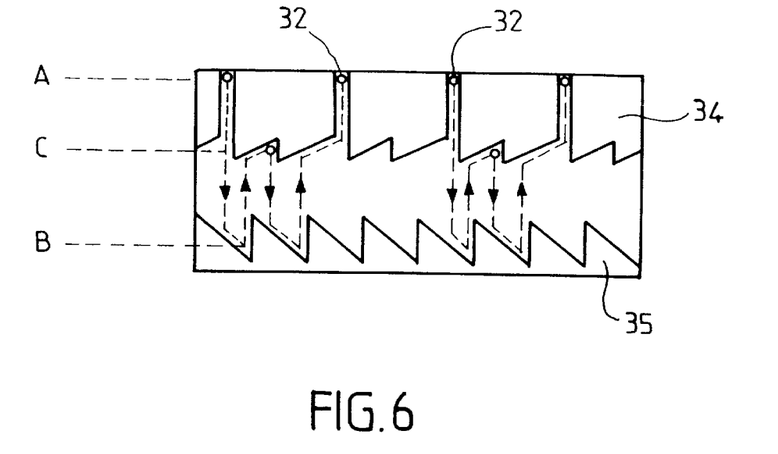
FIG. 6 is a pictorial view illustrating a linear development of the shape presented by one of the parts of the control means of FIGS. 4 and 5.

FIG. 6 shows a developed version of raised portions 34 and 35 and the path followed by cylindrical element 30 in response to a succession of vertical movements of control element 9.

FIGS. 4, 5 and 6 serve to illustrate the operating principal of this embodiment. Specifically, in this embodiment, cross piece 27 and rod 14 are displaced horizontally, in the same manner as in the first embodiment, by a vertical displacement of control element 9. The interaction between cylindrical element 30, and in particular lugs 32, and raised portions 34 and 35 provides two stable positions for control element 9. These two positions are shown in FIGS. 4 and 5, respectively.

Vertical displacement of control element 9 in the direction of axis of x-x' causes finger 28 to slide along surface 25 against a restoring force produced by compression of spring 16. The sliding movement of finger 28 causes a horizontal displacement of rod 14 in the direction of arrow D in FIG. 5. Depression of control element 9 in the direction of arrow E of FIG. 5 moves cylindrical element 30 in the same direction.

FIG. 6 shows the path followed by lugs 32 in response to successive depressions of control element 9. Each time control element 9 is depressed, lugs 32 move downwardly in a straight line then travel along an inclined path determined by one of the teeth of raised portion 35. When control element 9 is then released, lugs 32 will move upwardly in a straight line and then follow an inclined path defined by one of the teeth of raised portion 34. It should be readily apparent that other configurations of raised portions 34 and 35 can be utilized without departing the framework of the invention.

Thus, more specifically, it will be assumed that control element 9 is initially in the position shown in FIG. 4, in which case lugs 32 are at the level A shown in FIG. 6 and rod 14 is in a position that limits upper movement of the bread-supporting carriage to the lower bread discharge position, which is the normal bread discharge position. Then, if control element 9 is manually depressed in the direction of the arrow E of FIG. 5, lugs 32 first move to level B, which induces a rotation of element 30 about axis x-x', after which, when the user removes their finger or thumb from control element 9, control element 9 is moved upwardly under the effect of spring 36. The uppermost position of control element 9 is defined by interaction between a lug 37 and lateral projection 26 on control element 9 and abutment surfaces of housing 2. As control element 9 is permitted to move upwardly, springs 36 and 24 cooperate to displace element 30 upwardly so that lugs 32 follow paths which first extend vertically upwardly and then follow upwardly inclined paths defined by two of the teeth on raised portion 34, producing a further rotation of element 30 about axis x-x'. At this time, lugs 32 arrive at the level C of FIG. 6 and control element 9 will be in the position shown in FIG. 5. Thus, rod 14 and cross piece 27 will have been displaced to the right from the position shown in FIG. 4 to the position shown in FIG. 5. In this position, rod 14 can enter recess 18 as shown in FIGS. 2 and 3, so that the carriage can ascend to its upper discharge position.

A further depression and release of control element 9 brings lugs 32 into two of the vertical slots in raised portion 34, so that lugs 32 again ascend to level A of FIG. 6 and rod 14 and cross piece 27 are shifted back into the position shown in FIG. 4.

Thus, by successive two depressions of control element 9 in the direction of arrow E, element 30 passes in alternation between level A and level B while undergoing a 90° rotation about axis x-x'. Downward movement of control element 9 is transmitted to element 30 by compression spring 24. When control element 9 is released by the user, element 30 will be urged upwardly by spring 36 and control element 9 will be urged upwardly by spring 24. However, upward movement of element 30 with control element 9 is controlled by the abutting relation between abutment 31 and element 30. Successive upward movements of elements 30 will bring lugs 32 to levels C and A in alternation. Level C is associated with displacement of rod 14 to the right as shown in FIG. 4, while level A is associated with displacement of rod 14 to the left, as shown in FIG. 4.

Thus, with an arrangement of the type shown in FIGS. 4–6, the user can freely select, at any time before or during a toasting operation, either one of the raised positions to which the carriage will ascend after a toasting operation has been completed. The user need not hold the control means down in order to achieve this result.

The level to which control element 9 rises after having been released by the user will provide a visual indication of which bread discharge position has been selected.

Figure 7:
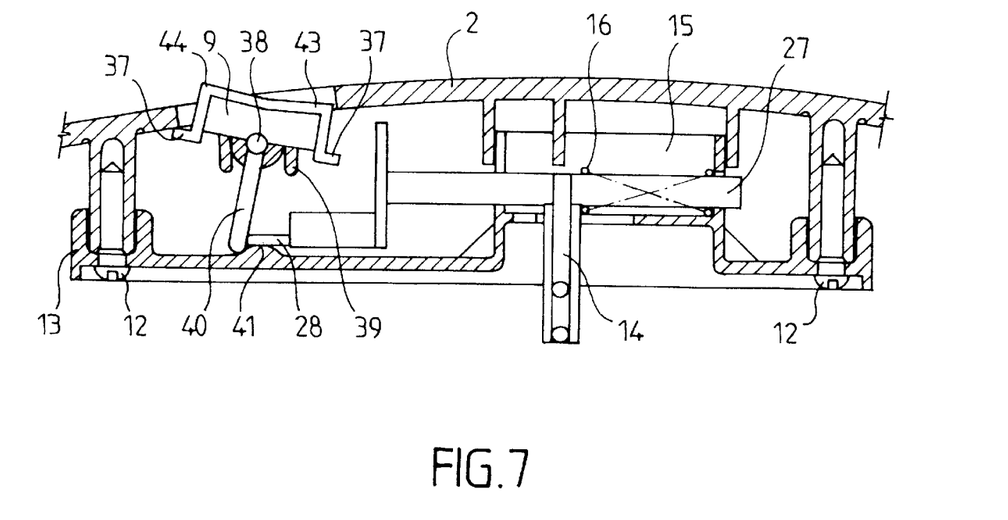
FIG. 7 is an elevational, cross-sectional detail view of another embodiment of a control means according to the invention.

FIG. 7 shows a third embodiment of a control means according the invention. According to this embodiment, control element 9 is in the form of a rocker switch having two ends 43 and 44 which are accessible from outside housing 2. Control element 9 can pivot between two positions about a horizontal axis 38 in response to depression of either one of ends 43 and 44 and the position to which control element 9 has been pivoted will determine which bread discharge position the carriage reaches after a toasting operating has been completed. Axis of rotation 38 is defined by a cylindrical element that is guided in a part 39 secured to housing 2. The pivoting movement of control element 9 is limited by two lugs 37 which form part of control element 9 and are located to interact with respective portions of housing 2. In addition, control element 9 carries a rod 40 which extends downwardly from axis 38 and is moveable as a unit with control element 9.

During pivotal movement of control element 9, the lower end of rod 40 brushes along a portion of support 13. In the illustrated embodiment, support 13 is provided with an upwardly projecting boss 41 which is dimensioned and located to constitute a detent element for rod 40. Boss 41 cooperates with rod 40 to retain rod 40 and control element 9 in either one of the two end positions to which these elements can be pivoted. However, rod 40 has a certain flexibility which allows it to pass over boss 41 when the user depresses one end 43, 44 of control element 9.

The arrangement including rod 14, cross piece 27, spring 16 and finger 28 has the same form as in the embodiment shown in FIGS. 4 and 5. In the case of the embodiment shown in FIG. 7, finger 28 extends transversely to, and remains in contact with, rod 40 due to the biasing action of spring 16.

In this embodiment, control element 9 is free to undergo a limited degree of pivoting movement around axis 38 and can assume only two stable positions. In the stable position shown in FIG. 7, rod 14 is maintained by the biasing action of spring 16, in the position that allows the carriage to ascend only to its lower bread discharge position and the biasing action of spring 16 also maintains control element 9 in the illustrated position. This position is further defined by contact between the left-hand lug 37 and an associated part of housing 2.

In order to displace rod 14 to the right, and to its second position, the user will press downwardly on end 44 of control element 9 with sufficient force to cause the lower end of rod 40 to pass over boss 41. This movement of rod 40 over boss 41 is made possible by giving rod 40 and support 13 a sufficient degree of resilient deformability. After the lower end of rod 40 has moved past boss 41, rod 40 will be maintained in a second stable position by being, in effect, clamped between the right-hand side of boss 41 and finger 28. The movement of rod 40 will have displaced rod 14 and cross piece 27 to the right, against the restoring force produced by spring 16, to bring rod 14 into a position which allows the bread-supporting carriage to ascend to its upper bread discharge position, in the same manner as described with respect to FIGS. 2 and 3.

Thus, by pressing on either one of ends 43 or 44 of control element 9, the user can cause rod 40 to move to either side of boss 41 and control the bread discharge position that will be obtained by the carriage.

When using a toaster equipped with a control system according to the present invention, the user first introduces one or two slices of bread into slots 4 of the toaster then acts on lever 7 to lower the carriage to its toasting position, utilizing mechanisms that are conventional in the art. The desired degree of toasting is selected by appropriately positioning control element 8, also according to conventional practice in the art. Then, the user can select the desired bread discharge level by moving control element 9 to the desired position. The use of such a toaster is thus simple and practical since it is then possible to select in advance the bread discharge height for the carriage.

The present invention is not limited to the embodiments described herein. In effect, it is possible to provide numerous variations of these embodiments which remain within the framework of the invention. For example, the control means can be arranged to be moveable in translation in any direction or moveable in rotation about any axis without departing from the framework of the invention, or the abutment can follow a path having at least one position permitting interaction with the carriage in order to halt it in the lower bread discharge position and at least one position where the carriage can ascend to its upper bread discharge position.

Similarly, cushioning of the end of ascending movement of the carriage to the upper bread discharge position can be effected by an air escape system, commonly referred to as a "dashpot", or by a hydraulic cushion system. It would be would be equally possible to arrange two cushioning means only on the carriage itself, for example, by positioning a first means in recess 18 and a second means outside of this recess.

In order to simplify the system according to the invention, a simple leaf spring can be utilized to permit, at the time the carriage is brought to a halt, all cushioning of the end of its ascending movement. Such a cushioning device can be installed as desired on the carriage or on the abutment.

This cushioning means can also constitute the first means for cushioning the arrival of the carriage at its upper bread discharge position. In effect, a cushioning means could be arranged on the carriage, in recess 18 or on a lateral prolongation of extension 6, depending on whether or not the abutment is present, and this cushioning means will operate either by interaction with the abutment or, when the abutment is withdrawn, with the top of the toaster housing.

Similarly, a cushioning element can be arranged on the abutment in order to cushion the end of ascent of the carriage into its upper bread discharge position. For this purpose, it is necessary to provide for a weak interaction between the abutment and the carriage. This can be achieved, in the example proposed, by reducing the depth of recess 18 in order to permit an interaction between the abutment and extension 6 even when control element 9 is in the position corresponding to the upper bread discharge position of the carriage.

Moreover, the relationship between spring 21, abutment 20 and rod 14 can take various forms, notably as concerns the stopping means of the cylinder of the abutment. This can be a flange linked to rod 14, the cylinder having at its extremity a narrowed portion or an internal peripheral disc arranged to halt the cylinder by bearing on the flange. According to this configuration, the spring is arranged under the flange in such a manner as to be compressed by the vertical sliding of the abutment cylinder during interaction of the latter with extension 6.

It can be equally envisioned, in order to provide a device which can be manufactured at low cost, to dispose a simple spring which extends downwardly from the end of rod 14 and is mechanically held to the extremity of rod 14, with the free end of the spring performing the functions of abutment and cushioning means.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What we claim is:

1. A bread toaster comprising:

a frame;

a bread-supporting carriage mounted in the frame for vertical movement between a toasting portion and a first bread discharge position, the carriage having an extension;

first cushioning means for cushioning arrival of the carriage at the first bread discharge position;

return means mounted between the frame and the extension of the carriage; and a control means having an abutment and being movable in the frame for limiting ascent of the carriage to a second position by interaction of the abutment with a part of the carriage, wherein:

the second position is a second bread discharge position for discharging bread having a first size and the first bread discharge position is a position for discharging bread having a size smaller than the first size; and one of the abutment and the part of the carriage which interacts with the abutment is provided with second cushioning means for cushioning arrival of the carriage at the second position.

2. A toaster according to claim 1 further comprising a housing which encloses said frame and said carriage, said housing having an upper part, and wherein said control means has an extremity which extends out of the upper part of said housing, and said housing has a system of reference marks associated with said control means and providing indications of the bread discharge position determined by operation of said control means.

3. A toaster according to claim 1 wherein said control means comprise:

a vertically extending rod having a lower extremity, said abutment being disposed at said lower extremity of said rod; and a horizontal cross piece which is fixed to said rod and is moveable in a horizontal direction, and wherein said toaster further includes an enclosure in which at least one of said rod and said cross piece is mounted for horizontal translational movement.

4. A toaster according to claim 3 wherein said abutment is constituted by a cylinder mounted for sliding movement relative to said rod, and said control means further comprise a first cushioning spring disposed within said cylinder and arranged coaxially with respect to said rod, said first cushioning spring having a first end which is mechanically connected to said rod and a second end which is mechanically connected to said abutment, and wherein said rod and said abutment have complementary parts for limiting sliding movement of said abutment relative to said rod.

5. A toaster according to claim 4 wherein said means for limiting sliding movement of said abutment are constituted by a first part associated with said cylinder and a second part associated with said rod, with one of said parts being a tenon and the other said parts being a groove in which said tenon engages.

6. A toaster according to claim 4 wherein said means for limiting sliding movement of said abutment are constituted by a flange which is fixed to said rod, said cylinder constituting said abutment has an extremity which is arranged to bear against said flange when said abutment is not interacting with said extension, and said first cushioning spring is couple to said rod by bearing on a lower part of said flange.

7. A toaster according to claim 1 wherein said extension is provided with a recess disposed to cooperate with said abutment in order to permit said carriage to ascend to the first bread discharge position.

8. A toaster according to claim 7 wherein said first cushioning means and said second cushioning means are situated on said carriage and at least said second cushioning means are disposed in said recess.

9. A toaster according to claim 7 wherein said first cushioning means and said second cushioning means are both constituted by a cushioning element mounted on said rod and said recess has a bottom which is located in said carriage such that said cushioning element contacts said bottom when said carriage is at the first bread discharge position.

10. A toaster according to claim 3 wherein said control means further comprise a return means and said rod is mounted for movement against a force produced by said return means in such a manner that said rod has a rest position at which said abutment is located to assure ascent of said carriage to one of the bread discharge positions.

11. A toaster according to claim 3 wherein said control means further comprise a return means and said cross piece is mounted for movement against a force produced by said return means in such a manner that said rod has a rest position at which said abutment is located to assure ascent of said carriage to one of the bread discharge positions, said return means being arranged co-axially with said cross piece so that said cross piece constitutes a guide for said return means.

12. A toaster according to clam 3 wherein said control means further comprise: a return means for exerting a force to urge said control means into a position corresponding to one of the bread discharge positions; and a detent means for retaining said control means in the other one of the bread discharge positions against the force exerted by said return means.

13. A toaster according to claim 3 wherein said control means further comprise a manually operable control element fixed to said cross piece.

14. A toaster according to claim 3 wherein said control means further comprise a manually operable control element which is movable independently of said cross piece in a vertical direction; and a second return means exerting a force to urge said control element in an upward direction.

15. A toaster according to claim 14 wherein said control element comprises a lateral extension having an inclined surface and said cross piece has a finger which is in contact with said inclined surface, said inclined surface cooperating with said finger, for displacing said cross piece in a direction transverse to the vertical movement of said carriage in response to vertical displacement of said control element.

16. A toaster according to claim 15 wherein said control means further comprise: a cylindrical element linked to said control element, said cylindrical element having two diametrically opposed peripheral lugs and being mounted for vertical movement; a hollow cylinder which is fixed in position relative to said frame and which is provided internally with two raised portions each provided with a series of inclined surfaces, said cylindrical element being movable vertically within said cylinder in response to successive downward and upward movements of said control element so that said lugs are guided along said inclined surfaces and are halted at successive intermediate positions corresponding to two different vertical positions of said control element; and third return means coupled between said control element and said cylindrical element for exerting a force to urge said control element upwardly.

17. A toaster according to claim 3 wherein said control means comprise a manually operable control element which is mounted for pivotal movement about an axis transverse to the direction of movement of said carriage, said control element having a second rod that is substantially perpendicular to said axis and that cooperates with said cross piece.

18. A toaster according to claim 17 further comprising a support fixed to said frame and provided with a boss positioned to cooperate with said second rod to maintain said control element in a position in which it has been placed by manual operation and to thereby maintain said cross piece in a position corresponding to one of the bread discharge positions of said carriage.

* * * * *